(12) United States Patent  
Lee et al.

(10) Patent No.: US 8,980,103 B2
(45) Date of Patent: Mar. 17, 2015

(54) BALLAST WATER TREATMENT SYSTEM HAVING A BACK-PRESSURE FORMATION PART AND CONTROL METHOD THEREOF

(75) Inventors: Soo-Tae Lee, Busan (KR); Tae-Sung Pyo, Busan (KR); Sang-Gyu Cheon, Gimhae-si (KR)

(73) Assignee: Panasia Co., Ltd., Busan (KR)

( * ) Notice: Subject to any disclaimer, the term of this patent is extended or adjusted under 35 U.S.C. 154(b) by 917 days.

(21) Appl. No.: 13/035,288

(22) Filed: Feb. 25, 2011

(65) Prior Publication Data

US 2011/0303615 A1  Dec. 15, 2011

(30) Foreign Application Priority Data

Jun. 11, 2010  (KR) ........................ 10-2010-0055637

(51) Int. Cl.
| | |
|---|---|
| *C02F 1/00* | (2006.01) |
| *B01D 21/30* | (2006.01) |
| *C02F 1/32* | (2006.01) |
| *B63J 4/00* | (2006.01) |
| *C02F 103/08* | (2006.01) |
| *C02F 103/00* | (2006.01) |

(52) U.S. Cl.
CPC ................. *C02F 1/325* (2013.01); *B63J 4/002* (2013.01); *C02F 2103/08* (2013.01); *C02F 1/001* (2013.01); *C02F 1/008* (2013.01); *C02F 2103/008* (2013.01); *C02F 2201/3225* (2013.01); *C02F 2201/3227* (2013.01); *C02F 2201/324* (2013.01); *C02F 2201/326* (2013.01); *C02F 2201/328* (2013.01); *C02F 2209/001* (2013.01); *C02F 2209/02* (2013.01); *C02F 2209/03* (2013.01);

(Continued)

(58) Field of Classification Search
USPC ............. 210/85, 90, 409, 411, 416, 422, 748, 210/791, 797, 798; 422/186, 24
See application file for complete search history.

(56) References Cited

U.S. PATENT DOCUMENTS

RE39,522 E * 3/2007 Ishiyama ....................... 250/431
2007/0262029 A1* 11/2007 Yoshida et al. ............... 210/741
(Continued)

FOREIGN PATENT DOCUMENTS

CN          2765654 Y  *  3/2006  ............ B01D 29/33
KR    1020020084663 A     11/2002
(Continued)

OTHER PUBLICATIONS

English translation for foreign patent document CN-2765654.*
(Continued)

*Primary Examiner* — Lucas Stelling
*Assistant Examiner* — Rohit K Dewan
(74) *Attorney, Agent, or Firm* — Rabin & Berdo, P.C.

(57) ABSTRACT

Disclosed herein are a ballast water treatment system having a back-pressure formation unit and a control method thereof. Back pressure in a filtering unit is checked and formed during a back washing operation for a filter of a filtering unit, thus enabling efficient back washing operation. Both a method of physically filtering ballast water using the filter and a method of sterilizing ballast water using ultraviolet rays are used to treat ballast water, thus preventing secondary contamination due to byproducts, and preventing the contamination of a ballast tank. A flow rate of ballast water introduced into an ultraviolet treatment unit is controlled such that the efficiency of the ultraviolet treatment unit is not reduced, while back pressure is formed in the filtering unit, thus increasing the overall treatment efficiency of the ballast water treatment system. Further, the filtering unit or the ultraviolet treatment unit may be automatically washed.

2 Claims, 8 Drawing Sheets

(52) U.S. Cl.
CPC ....... *C02F 2209/40* (2013.01); *C02F 2301/043* (2013.01); *C02F 2303/04* (2013.01); *C02F 2303/16* (2013.01)
USPC ........ 210/741; 210/748.11; 210/90; 210/411; 422/24

(56) References Cited

U.S. PATENT DOCUMENTS

| | | |
|---|---|---|
| 2008/0190826 A1 | 8/2008 | Miner et al. |
| 2009/0321365 A1* | 12/2009 | Eriksson et al. ............. 210/741 |

FOREIGN PATENT DOCUMENTS

| | | |
|---|---|---|
| KR | 10-0765999 B1 | 10/2007 |
| KR | 10-2008-0038938 A | 5/2008 |
| KR | 1020100060839 A | 6/2010 |
| WO | WO 03059821 A1 | 7/2003 |
| WO | WO 2008039147 A2 | 4/2008 |
| WO | WO 2010062032 A2 | 6/2010 |

OTHER PUBLICATIONS

Merriam webster, definition of word "together", searched Jun. 4, 2014.*

* cited by examiner

BALLAST WATER TREATMENT SYSTEM HAVING A BACK-PRESSURE FORMATION PART AND CONTROL METHOD THEREOF

BACKGROUND OF THE INVENTION

1. Field of the Invention

The present invention relates generally to a system for treating ballast water used in a ship and a method of controlling the system and, more particularly, to a ballast water treatment system having a back-pressure formation unit and a control method thereof, in which control method back-pressure in a filtering unit is checked and formed during a back washing operation for a filter of a filtering unit, thus enabling the back washing operation to be efficiently performed. Both a method of physically filtering ballast water using the filter of the filtering unit and a method of sterilizing ballast water using ultraviolet rays are used to treat ballast water, thus preventing secondary contamination due to byproducts, preventing the contamination of a ballast tank. The flow rate of ballast water introduced into an ultraviolet treatment unit is controlled such that the efficiency of the ultraviolet treatment unit is not reduced, while back-pressure is formed in the filtering unit, thus increasing the overall treatment efficiency of the ballast water treatment system. The filtering unit or the ultraviolet treatment unit may be automatically washed, thus always maintaining uniform performance and enabling efficient maintenance.

2. Description of the Related Art

Ballast water is the seawater that is put into a ballast tank of a ship in order for the ship to maintain its balance while sailing without goods. The increasing volume of internal trade has led to an increase in the ratio of marine transportation, so that the numbers and size of the ships have also been rapidly increasing. Thus, the volume of ballast water used in ships has also increased considerably. As the volume of the ballast water used in the ship has increased, damage done to the endemic marine ecosystem resulting from it being attacked by exotic marine organism species is also increasing. In order to address the international environmental contamination problem, the Internal Maritime Organization (IMO) completed the 'International treaty concerning control and management of ballast water and sediment of ships' in 2004, which became effective in 2009.

The ballast water contains various kinds of microorganisms, thus causing marine contamination and disturbing the ecosystem. Thus, these microorganisms and inorganic sources of contamination must be treated. Conventional methods of treating ballast water include a marine treatment method of exchanging ballast water in the sea and a land treatment method but they are ineffective. Thus, a method of installing a ballast water treatment system in a ship has been widely used. The ballast water treatment system mainly uses filtering, heat treatment, chemical treatment, electrolysis, ozone treatment or ultraviolet ray radiation, etc.

However, the heat treatment is problematic in that it is difficult to treat microorganisms or inorganic sources of contamination which are resistant to heat. The chemical treatment is problematic in that secondary contamination may occur after ballast water has been treated. Further, the electrolysis or ozone treatment is problematic in that an explosion may be caused by a short circuit and it is inefficient to manage. The filtering is problematic in that sediment must be removed from a filter. Further, the ultraviolet ray radiation is problematic in that its efficiency is low because of foreign substances adhering to the surface of a sleeve which surrounds an ultraviolet lamp.

Figure 1:
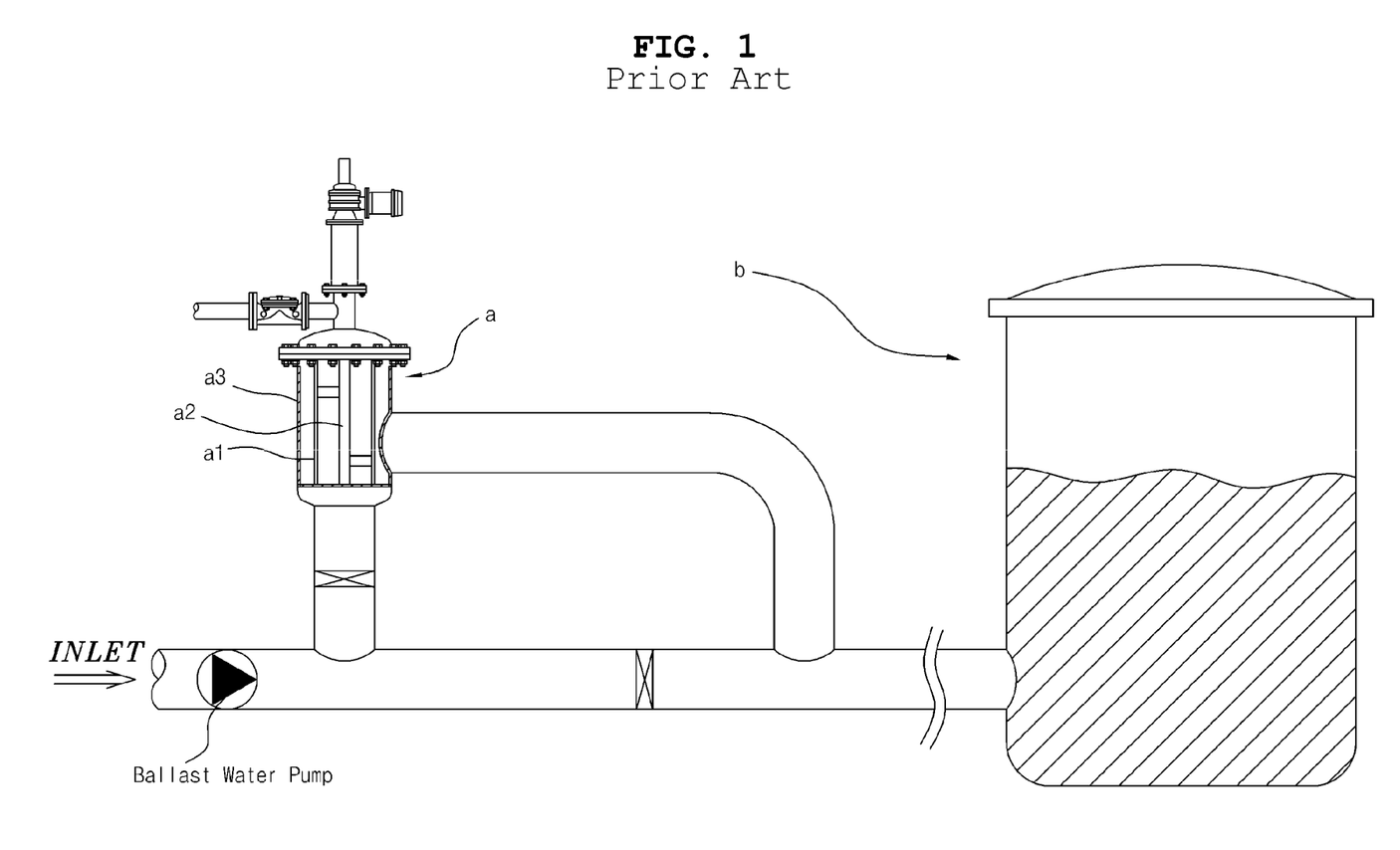
FIG. 1 is a schematic view showing a conventional filtering-type ballast water treatment system.
Figure 2:
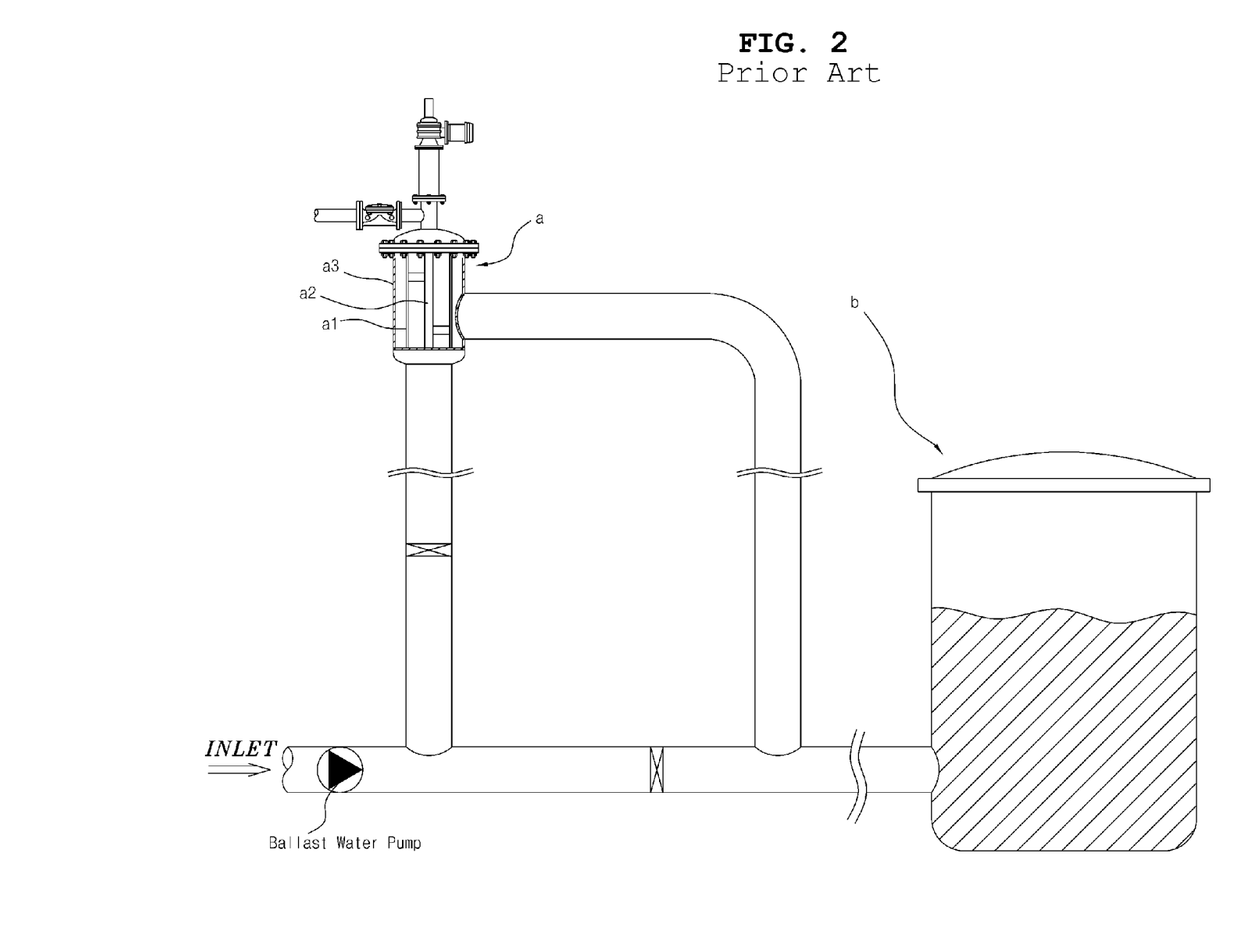
FIG. 2 is a schematic view showing another conventional filtering-type ballast water treatment system.

FIG. 1 is a schematic view showing a conventional filtering-type ballast water treatment system. In the conventional filtering method, when a washing operation of removing foreign substances from an inner surface of a filter a1 in a filtering unit a is performed, internal pressure of the filtering unit a must be higher than external pressure of the filtering unit a (i.e., internal pressure of a washing unit a2 sucking foreign substances from the inner surface of the filter a1). That is, in order to perform a smooth washing operation, back-pressure must be formed. The term 'back-pressure' used herein means pressure which is set such that internal pressure of a body a3 of the filtering unit a is larger than internal pressure of the washing unit a2 sucking the foreign substances from the inner surface of the filter a1, thus allowing the ballast water and the foreign substances to move from the body a3 of the filtering unit a to the washing unit a2. If a ballast tank b for storing filtered ballast water is empty or the amount of the ballast water stored in the ballast tank b is small even though the filtering unit a is pressurized using a ballast water pump to supply ballast water, a required back-pressure is not formed, so that a smooth washing operation is impossible. Especially, as shown in FIG. 2, because of a spatial restriction of a space in which the ballast water treatment system is installed, for example, a ship, the filtering unit a may be located at a position higher than that of the ballast tank b. In this case, the loss of water head occurs, so that it is more difficult to maintain the back-pressure. In spite of the restriction, there is a demand for a system for allowing foreign substances in the filter to be smoothly washed.

Accordingly, the present invention has been made keeping in mind the above problems occurring in the prior art, and an object of the present invention is to provide a ballast water treatment system having a back-pressure formation unit and a control method thereof, in which back-pressure in a filtering unit is checked and formed during a back washing operation for a filter of the filtering unit, thus enabling the back washing operation to be efficiently performed.

Another object of the present invention is to provide a ballast water treatment system having a back-pressure formation unit and a control method thereof, in which both a method of physically filtering ballast water using a filter and a method of sterilizing ballast water using ultraviolet rays are used to treat ballast water, thus preventing secondary contamination due to byproducts, preventing the contamination of a ballast tank, enabling efficient maintenance, and making the system easy to control.

A further object of the present invention is to provide a ballast water treatment system having a back-pressure formation unit and a control method thereof, in which a flow rate of ballast water introduced into an ultraviolet treatment unit is controlled such that the efficiency of the ultraviolet treatment unit is not reduced, while back-pressure is formed in a filtering unit, thus increasing the overall treatment efficiency of a ballast water treatment system.

Yet another object of the present invention is to provide a ballast water treatment system having a back-pressure formation unit and a control method thereof, in which a filtering unit or an ultraviolet treatment unit may be automatically washed, thus always maintaining uniform performance, and enabling efficient maintenance.

A still further object of the present invention is to provide a ballast water treatment system having a back-pressure formation unit and a control method thereof, in which a bypass duct may be further provided between a filtering unit and an ultraviolet treatment unit, thus allowing ballast water to be treated while passing through only either the filtering unit or the ultraviolet treatment unit, as necessary.

SUMMARY OF THE INVENTION

In order to accomplish the above objects, the present invention provides a ballast water treatment system having a back-pressure formation unit and a control method thereof, constructed as will be described below.

According to an embodiment of the present invention, a ballast water treatment system includes a filtering unit including a body having an inlet and an outlet that respectively permit inflow and outflow of ballast water, a filter located in the body to filter the ballast water introduced into the inlet, and an automatic washing unit for removing foreign substances from the filter; and a back-pressure formation unit for checking and forming back-pressure in the filtering unit during a back washing operation of the automatic washing unit, thus enabling the back washing operation to be smoothly performed. The automatic washing unit removes the foreign substances from the filter using a difference between pressure inside the body and pressure outside the body, and includes a suction unit for sucking the foreign substances adhering to the filter, and an exhaust unit communicating with the suction unit, selectively communicating with an outside, and discharging the sucked foreign substances to the outside. The back-pressure formation unit includes a pressure sensor for checking back-pressure in the body, and a first control valve provided between the outlet of the body and an ultraviolet treatment, preferably between the body and a ballast tank in such a way as to be placed on a duct in which the ballast water flows. Thus, if the back-pressure in the body detected by the pressure sensor does not reach back washing pressure, the first control valve is closed or a path of the duct is narrowed to increase the back-pressure in the body, thus allowing the back washing operation of the automatic washing unit to be smoothly performed.

The ballast water treatment system includes an ultraviolet treatment unit for sterilizing ballast water filtered by the filtering unit using ultraviolet rays. The ultraviolet treatment unit may include a body having an inlet and an outlet that respectively permit inflow and outflow of the ballast water, an ultraviolet lamp radiating ultraviolet rays to the ballast water which flows in the body, a sleeve washing unit for removing foreign substances from a sleeve which surrounds the ultraviolet lamp, an ultraviolet meter for measuring intensity of ultraviolet rays which are emitted from the ultraviolet lamp, and a temperature sensor for measuring temperature in the body.

According to a further embodiment of the present invention, the back-pressure formation unit may further include a second control valve provided on the duct in which the ballast water treated by the ultraviolet treatment unit flows, and controlling a flow rate of the ballast water which flows in the duct under control of a control unit, thus forming back-pressure in the filtering unit along with the first control valve.

According to yet another embodiment of the present invention, the sleeve washing unit may include a wiper attached to an outer circumference of the sleeve, a driving shaft connected to the wiper, and a driving motor connected to the driving shaft to actuate the driving shaft.

According to an embodiment of the present invention, a method of controlling a ballast water treatment system having a back-pressure formation unit includes filtering ballast water using a filtering unit, the filtering unit including a body having an inlet and an outlet that respectively permit inflow and outflow of ballast water, a filter located in the body to filter the ballast water introduced into the inlet, and an automatic washing unit for removing foreign substances from the filter; and for hecking and forming back-pressure in the filtering unit to enable a back washing operation to be smoothly performed, using the back-pressure formation unit, when the back washing operation for removing the foreign substances from the filter of the filtering unit is performed by the automatic washing unit, the automatic washing unit removing the foreign substances from the filter using a difference between pressure inside the body and pressure outside the body and including a suction unit for sucking the foreign substances adhering to the filter, and an exhaust unit communicating with the suction unit, selectively communicating with an outside, and discharging the sucked foreign substances to the outside. The step of checking and forming the back-pressure includes checking the back-pressure in the body using a pressure sensor that checks pressure in the body, and forming the back-pressure in the body by closing a first control valve provided between the outlet of the body and a ballast tank in such a way as to be positioned on a duct in which the ballast water flows or by narrowing a path of the duct, if back-pressure in the body detected by the pressure sensor does not reach back washing pressure.

According to another embodiment of the present invention, at the forming the back-pressure, the control unit may control a second control valve, provided on the duct in which ballast water treated by the ultraviolet treatment unit flows so as to control a flow rate of the ballast water flowing in the duct, together with the first control valve, thus forming back-pressure in the filtering unit.

According to a further embodiment of the present invention, the step of checking and forming the back-pressure may further include releasing artificially formed back-pressure by controlling the first control valve and the second control valve via the control unit, when a back washing operation of removing foreign substances from the filter of the filtering unit has been completed by the automatic washing unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, a ballast water treatment system having a back-pressure formation unit and a control method thereof according to the preferred embodiment of the present invention will be described in detail with reference to the accompanying drawings.

Figure 3:
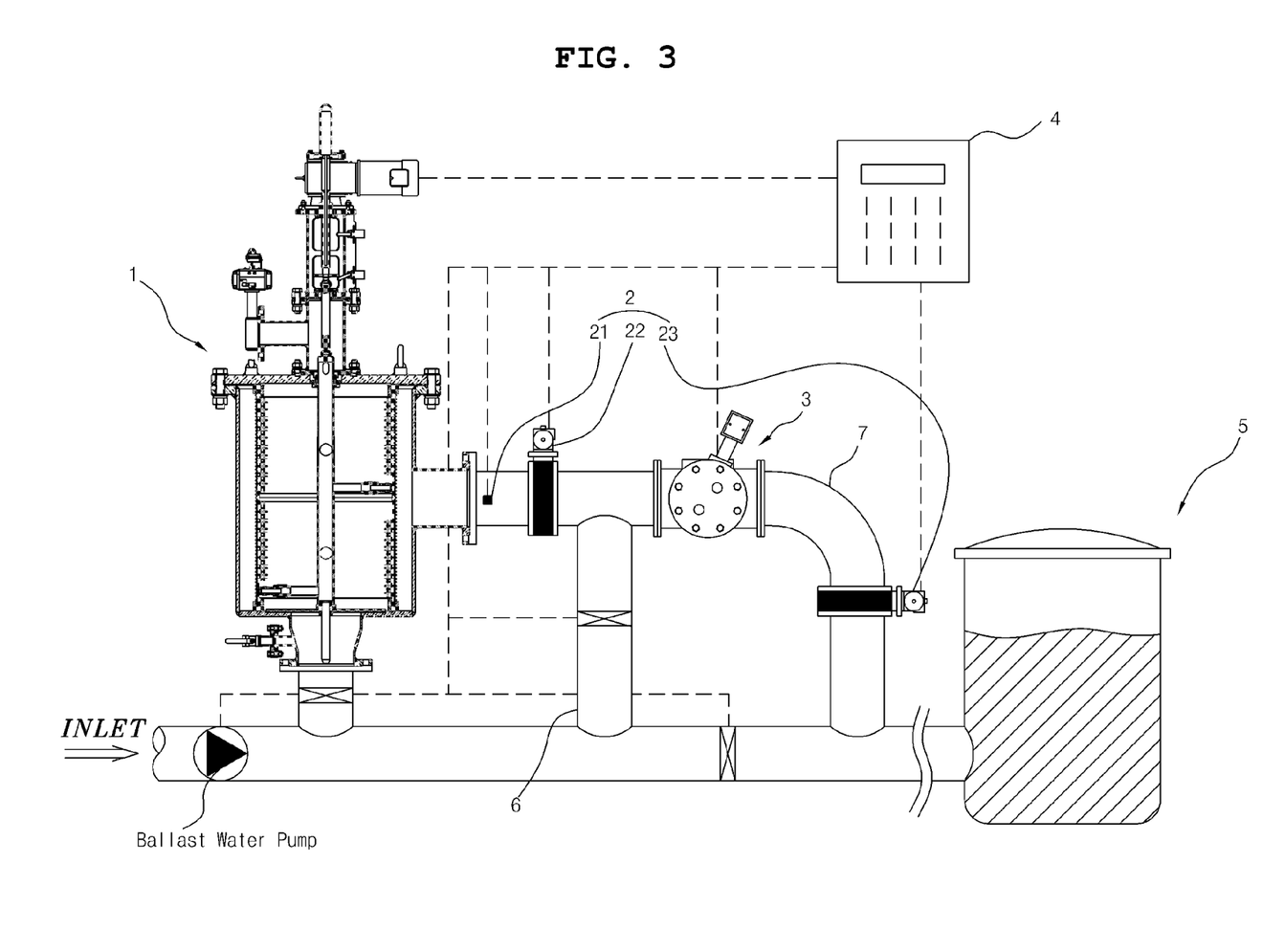
FIG. 3 is a schematic view showing a ballast water treatment system having a back-pressure formation unit, according to an embodiment of the present invention.
Figure 4:
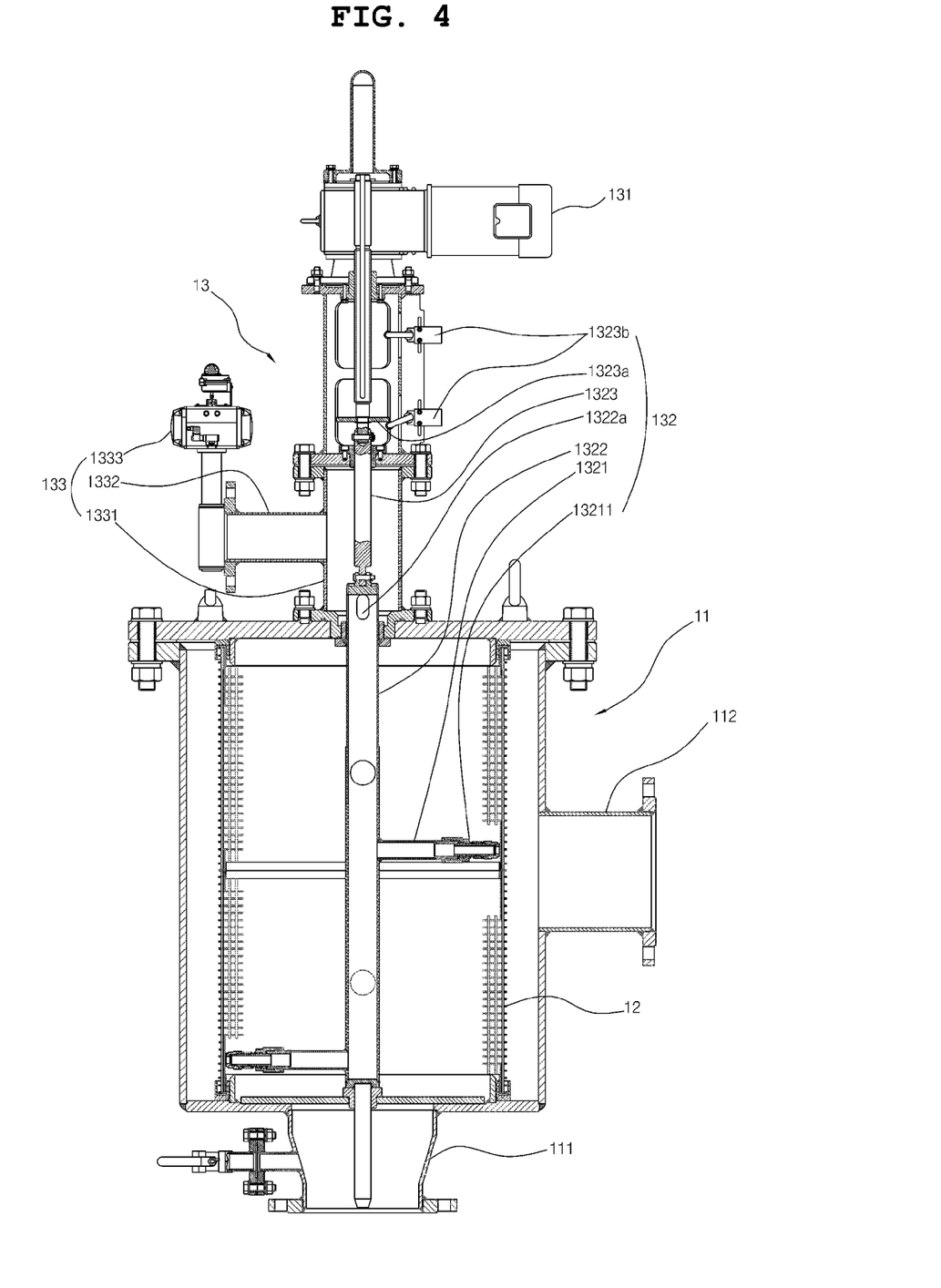
FIG. 4 is a sectional view showing a filtering unit of FIG. 3.
Figure 5:
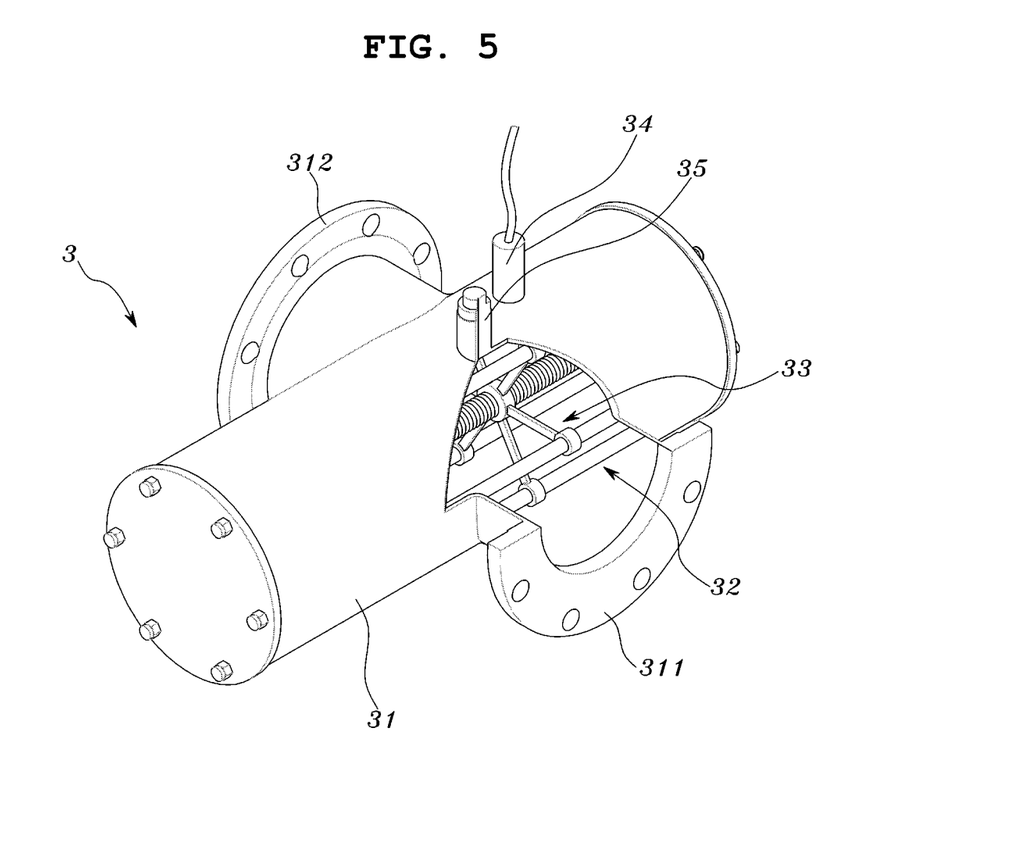
FIG. 5 is a partially cutaway perspective view showing an ultraviolet treatment unit of FIG. 3.
Figure 6:
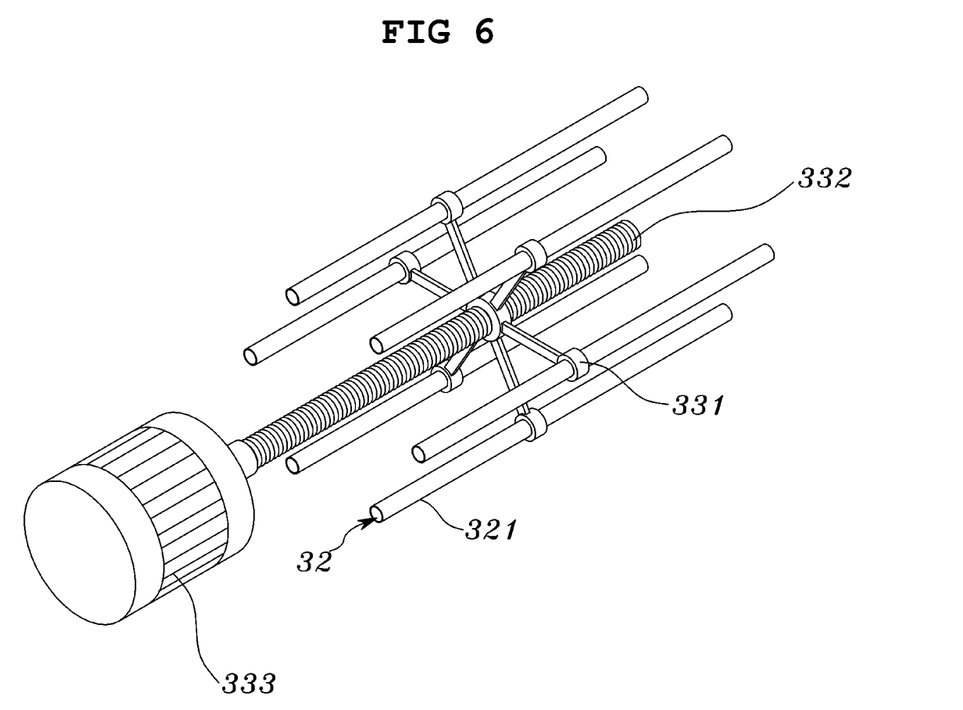
FIG. 6 is a perspective view showing a sleeve washing unit of the ultraviolet treatment unit.

FIG. 3 is a schematic view showing a ballast water treatment system having a back-pressure formation unit, according to an embodiment of the present invention, FIG. 4 is a sectional view showing a filtering unit of FIG. 3, FIG. 5 is a partially cutaway perspective view showing an ultraviolet treatment unit of FIG. 3, and FIG. 6 is a perspective view showing a sleeve washing unit of the ultraviolet treatment unit.

Referring to FIGS. 3 to 6, a ballast water treatment system according to an embodiment of the present invention includes a filtering unit 1, a back-pressure formation unit 2, an ultraviolet treatment unit 3, and a control unit 4. The filtering unit 1 includes a body 11, a filter 12, and an automatic washing unit 13. The body 11 has an inlet 111 and an outlet 112 to permit the inflow and outflow of ballast water which is taken from a ship. The filter 12 filters the ballast water which passes through the body 11. The automatic washing unit 13 functions to back wash foreign substances adhering to the filter 12. The back-pressure formation unit 2 checks and forms back-pressure in the filtering unit 1 during the back washing operation of the automatic washing unit 13, thus allowing the back washing operation to be smoothly performed. The ultraviolet treatment unit 3 sterilizes the ballast water filtered by the filtering unit 1, using ultraviolet rays. The control unit 4 controls the overall operation of the ballast water treatment system.

The filtering unit 1 functions to filter the ballast water taken from the ship. The filtering unit 1 includes the body 11, the filter 12, and the automatic washing unit 13. The body 11 has an inlet 111 and an outlet 112 to permit the inflow and outflow of the ballast water which is taken from the ship. The filter 12 filters the ballast water which passes through the body 11. The automatic washing unit 13 functions to back wash foreign substances adhering to the filter 12. The term 'back wash' used herein means the operation of removing foreign substances from the inner surface of the filter while ballast water filtered by the filter flows back from the outside to the inside of the filter and is sucked and discharged along with the foreign substances adhering to the inner surface of the filter.

The body 11 defines the body of the filtering unit 1, and may preferably have the shape of a cylinder that has a space therein. The body 11 includes the inlet 111 into which the ballast water taken into the ship is introduced, and the outlet 112 through which filtered ballast water is discharged. According to the present invention, as will be described below, the filtering unit 1 performs a filtering operation using the filter 12 which surrounds the interior of the body 11. Thus, it is preferable that the inlet 111 be located at a lower position of the body 11 and the outlet 112 be located above the inlet 111 so that ballast water flowing into the lower portion of the body 11 is filtered while filling the interior of the body 11.

The filter 12 functions to filter the ballast water introduced into the body 11 through the inlet 111, and may preferably have a cylindrical shape along the inner circumference of the body 11 to surround the interior of the body 11. Thus, in order to discharge the ballast water, which flows through the inlet 111 into the body 11, through the outlet 112, the ballast water must necessarily pass through the filter 12. While the ballast water is filtered by the filter 12, organisms and particles over 50 μm are removed. In the case of continuously performing the filtering operation, foreign substances accumulate in the inner surface of the filter 12, so that the filtering function is deteriorated and thus the operation of removing foreign substances is performed by the automatic washing unit 13 that will be described below in detail.

The automatic washing unit 13 serves to automatically remove foreign substances from the inner surface of the filter 12 under the control of the control unit 4 using a difference in pressure between the inside and the outside of the body 11 (i.e., when a difference in pressure between the inside and the outside of the filter 12 measured by a pressure sensor installed at each of the inlet 111 and the outlet 112 exceeds a predetermined range). The automatic washing unit 13 includes a driving unit 131, a suction unit 132, and an exhaust unit 133. The driving unit 131 drives the automatic washing unit 13 in response to a signal of the control unit 4. The suction unit 132 is connected to the driving unit 131 to be moved by the driving unit 131, and sucks foreign substances adhering to the filter 12. The exhaust unit 133 functions to discharge foreign substances from the suction unit 132.

The driving unit 131 serves to provide the power that operates (moves up and down and rotates) the automatic washing unit 13, in more detail, the suction unit 132. The driving unit 131 may use a general motor, and is automatically operated under the control of the control unit 4.

The suction unit 132 is connected to the driving unit 131 to be rotated and moved up and down, thus sucking foreign substances from the inner surface of the filter 12. The suction unit 132 includes suction rods 1321, a core 1322, and a driving shaft 1323. Each suction rod 1321 functions to suck foreign substances adhering to the inner surface of the filter 12 through a suction nozzle 13211 which is formed in an end of the suction rod 1321. The core 1322 is connected to the suction rod 1321 to move the sucked foreign substances. The driving shaft 1323 is connected between the core 1322 and the driving unit 131 to move the core 1322 in conjunction with the operation of the driving unit 131. The suction rod 1321 is the part that sucks foreign substances from the inner surface of the filter 12, and may have the shape of a rod or bar which has a through hole therein. The suction nozzle 13211 is provided on one end of the suction rod 1321 to be in close contact with the inner surface of the filter 12 and thus suck foreign substances from the inner surface of the filter 12, and the other end is connected to the core 1322 to move the sucked foreign substances to the core 1322. A plurality of suction rods 1321 may be radially attached to the outer circumference of the core 1322 in such a way that they have different heights. Such a construction allows foreign substances to be more easily sucked from the filter 12 when the core 1322 moves up and down while rotating, as will be described below. The principle wherein the suction nozzle 13211 sucks foreign substances from the inner surface of the filter 12 uses the flow of ballast water caused by a difference in pressure between high pressure in the body 11 and low pressure in each suction rod 1321 or the core 1322, which will be described below in detail. The core 1322 is connected to the suction rods 1321 to move the sucked foreign substances. The core 1322 may have the shape of a rod or bar which is hollow therein, and the suction rods 1321 are radially attached to the outer circumference of the core 1322. Thereby, the foreign substances sucked through the suction rods 1321 may move through the internal space of the core 1322. An exhaust hole 1322a is formed in one end of the core 1322 so that foreign substances passing through the internal space are discharged to a flushing chamber 1331 of the exhaust unit 133, which will be described below. Further, one end of the core 1322 is connected to the driving shaft 1323, so that the core 1322 may perform rotary movement as well as vertical movement, as the driving shaft 1323 moves. The driving shaft 1323 is the part that is connected between the core 1322 and the driving unit 131, and moves up and down and rotates the core 1322 in conjunction with the operation of the driving unit 131. The outer circumference of one end of the driving shaft 1323 connected with the driving unit 131 may be formed to have a threaded part. This enables the vertical movement and the rotation of the driving shaft 1323 as the driving unit 131 is operated, thus allowing foreign substances to be more efficiently sucked from the filter 12. Further, a contact means 1323a may be coupled to an end of the driving shaft 1323. The contact means 1323a is a part that comes into contact with limit switches 1323b which limit the vertical moving distance of the driving shaft 1323, and may comprise a disc-shaped rubber member or metal member. When the contact means 1323a is in contact with each limit switch 1323b, the movement direction of the driving shaft 1323 changes under the control of the control unit 4, so that the driving shaft 1323 moves up and down between the limit switches 1323b.

The exhaust unit 133 functions to discharge foreign substances from the suction unit 132. The exhaust unit 133 includes the flushing chamber 1331, an exhaust pipe 1332, and an exhaust valve 1333. The flushing chamber 1331 stores foreign substances which are discharged through the exhaust hole 1322a formed in one end of the core 1322. The exhaust pipe 1322 is the passage through which the foreign substances of the flushing chamber 1331 are discharged. The exhaust valve 1333 is provided at a position of the exhaust pipe 1332. The flushing chamber 1331 is the part in which foreign substances discharged through the exhaust hole 1322a of the core 1322 accumulate. Preferably, the size and shape of the flushing chamber 1331 are set in consideration of the distance the core 1322 moves up and down so that the flushing chamber 1331 may store foreign substances discharged from the exhaust hole 1322a of the core 1322 in any circumstances. The exhaust pipe 1332 is the passage through which the foreign substances of the flushing chamber 1331 are discharged, and may have the shape of a pipe which is connected to a side of the flushing chamber 1331. The exhaust valve 1333 is connected to a portion of the exhaust pipe 1332 and provides a suction force to suck and discharge foreign substances from the filter 30. The exhaust valve 1333 is controlled by the control unit 4. That is, when the exhaust valve 1333 is open, the interiors of the exhaust pipe 1332, the flushing chamber 1331, the core 1322 and the suction rods 1321 have atmospheric pressure, that is, are at a pressure lower than the high pressure in the body 11. The ballast water existing in the body 11, especially the filtered ballast water existing outside the filter 12 is sucked into each suction nozzle 13211 and each suction rod 1321 which are at low pressure. At this time, foreign substances adhering to the inner surface of the filter 12 are also sucked up. Meanwhile, when the exhaust valve 1333 is closed, the suction of ballast water and foreign substances is stopped. In order to smoothly remove foreign substances from the inner surface of the filter 12 by operating the exhaust valve 1333, back-pressure in the body 11 must be higher than atmospheric pressure. However, as described in the problems of the related art, the back-pressure in the body 11 may not always remain high for a difference in level of ballast water filled in the ballast tank or other reasons. Thus, in order to solve the problem, the ballast water treatment system of the present invention further includes the back-pressure formation unit 2.

The back-pressure formation unit 2 is constructed to check and form back-pressure in the filtering unit 1 in the back washing operation of the automatic washing unit 13, thus allowing the back washing operation to be smoothly performed. To this end, the back-pressure formation unit 2 includes a pressure sensor 21, a first control valve 22, and a second control valve 23. The pressure sensor 21 checks back-pressure in the filtering unit 1, namely, the body 11. The first control valve 22 is provided at a position on a duct 7 in which ballast water filtered by the filtering unit 1 flows, and controls the flow rate of the ballast water flowing in the duct 7 under the control of the control unit 4, thus forming back-pressure in the filtering unit 1, namely, the body 11. The second control valve 23 is provided at a position on the duct 7 in which ballast water, treated by the ultraviolet treatment unit 3 that will be described below, flows, and controls the flow rate of the ballast water flowing in the duct 7 under the control of the control unit 4, thus forming back-pressure in the filtering unit 1, namely, the body 11 along with the first control valve 22.

The pressure sensor 21 functions to check back-pressure in the filtering unit 1, namely, the body 11, and may comprise general sensors for measuring pressure. Preferably, the pressure sensor 21 is provided at a position around the outlet 112 so as to precisely measure the pressure of the outside of the filter 12 at which ballast water filtered by the filter 12 is located. A value of back-pressure in the body 11 measured by the pressure sensor 21 is transmitted to the control unit 4, and thus is utilized to operate the back-pressure formation unit 2 by the control unit 4.

The first control valve 22 is installed at a position on the duct 7 in which ballast water filtered by the filtering unit 1 flows, and is constructed to control the flow rate of the ballast water flowing in the duct 7 under the control of the control unit 4, thus forming back-pressure in the filtering unit 1, namely, the body 11. The first control valve 22 may comprise a flow control valve which is universally used. For example, the first control valve 22 may be installed at any position behind the filtering unit 1 as long as it may form back-pressure. The first control valve 22 is connected to the control unit 4, and is electrically controlled in response to a signal of the control unit 4, thus completely opening or closing the duct 7 or partially opening or closing the duct 7 so as to allow a predetermined amount of ballast water to flow. As the opening ratio of the duct 7 is reduced by the first control valve 22, back-pressure in the body 11 is increased. In contrast, as the opening ration of the duct 7 is increased by the first control valve 22, back-pressure in the body 11 is reduced. Thus, if back-pressure in the body 11 measured by the pressure sensor 21 does not reach a reference value which is required for the back washing operation of the filter 12 by the automatic washing unit 13, the control unit 4 transmits a closing signal to the first control valve 22, thus closing the first control valve 22 until the back-pressure reaches the required reference value.

The second control valve 23 is installed at a position on the duct 7 in which ballast water, treated by the ultraviolet treatment unit 3, flows, and is constructed to control the flow rate of the ballast water flowing in the duct 7 under the control of the control unit 4, thus forming back-pressure in the filtering unit 1, namely, the body 11 along with the first control valve 22. Similarly to the first control valve 22, the second control valve 23 may comprise a flow control valve which is universally used. In a similar manner to the first control valve 22, the second control valve 23 is also connected to the control unit 4, and is electrically controlled in response to a signal of the control unit 4, thus completely opening or closing the duct 7 or partially opening or closing the duct 7 so as to allow a predetermined amount of ballast water to flow. In particular, the second control valve 23 is operated together with the first control valve 22, and is located behind the ultraviolet treatment unit 3. Thus, as compared to the case wherein only the first control valve 22 is operated, the flow rate of ballast water which flows through the duct 7 and is introduced into the ultraviolet treatment unit 3 may be controlled as necessary, thus increasing the efficiency of treating the ballast water, and enabling the flow rate controlling operation and the back-pressure controlling operation of the control unit 4 to be more precisely performed.

The process of forming back-pressure by the operation of the back-pressure formation unit 2 will be described in detail in a control method of this invention.

The ultraviolet treatment unit 3 functions to sterilize ballast water filtered by the filtering unit 1, using ultraviolet rays. Referring to FIGS. 5 and 6, the ultraviolet treatment unit 3 includes a body 31, an ultraviolet lamp 32, a sleeve washing unit 33, an ultraviolet intensity meter 34, and a temperature sensor 35. The body 31 has an inlet 311 and an outlet 312 that permits the inflow and outflow of ballast water. The ultraviolet lamp 32 radiates ultraviolet rays onto the ballast water flowing in the body 31. The sleeve washing unit 33 removes foreign substances from a sleeve 321 surrounding the ultraviolet lamp 32. The ultraviolet intensity meter 34 measures the intensity of the ultraviolet rays emitted from the ultraviolet lamp 32. The temperature sensor 35 functions to measure the internal temperature of the body 31. As necessary, a plurality of ultraviolet treatment units 3 may be continuously installed in series.

The body 31 defines the body of the ultraviolet treatment unit 3, and may preferably have the shape of a cylinder which has a space therein. The body 31 includes the inlet 311 into which ballast water flows and the outlet 312 through which sterilized ballast water is discharged. Preferably, the inlet 311 and the outlet 312 may be formed in a side surface of the cylindrical body 31 in order to increase the effect of sterilizing ballast water passing through the ultraviolet lamp 32.

The ultraviolet lamp 32 emits ultraviolet rays and radiates them into the ballast water flowing into the body 31. The ultraviolet lamp 32, shaped as a rod or bar, is positioned in the body 31. Preferably, a plurality of ultraviolet lamps 32 may be radially placed at regular intervals in the cylindrical body 31 in such a way as to be parallel to the body 31 in an axial direction thereof. Thereby, the ballast water flowing through the inlet 311 and the outlet 312 may pass by perpendicular to the ultraviolet lamps 32. If foreign substances adhere to a surface of the sleeve 321 surrounding the ultraviolet lamp 32, the intensity of the emitted ultraviolet rays is reduced. Thus, the surface of the sleeve 321 is washed by the sleeve washing unit 33.

The sleeve washing unit 33 functions to remove foreign substances from the surface of the sleeve 321. The sleeve washing unit 33 includes a wiper 331 which is attached to the outer circumference of the sleeve 321, a driving shaft 332 which is connected to the wiper 331, and a driving motor 333 which is connected to the driving shaft 332 to actuate the driving shaft 332. The wiper 331 functions to remove foreign substances from the outer circumference of the sleeve 321, and may preferably have an annular shape which surrounds the entire outer circumference of the sleeve 321. The wiper 331 may be made of synthetic resin or synthetic rubber having heat resistance. If there is a plurality of sleeves 321, a plurality of wipers 331 is required. In this case, each of the wipers 331 may be connected to the driving shaft 332. The driving shaft 332 is connected to the wiper 331 and moves the wiper 331 so that it may remove foreign substances from the outer circumference of the sleeve 321. Preferably, the driving shaft 332 may be provided in the central portion of the body 31 in such a way as to be parallel to the body 31 in the axial direction thereof, and the outer circumference of the driving shaft 332 may have a threaded part. The driving shaft 332 is connected at an end thereof to the driving motor 333. The driving motor 333 is connected to one end of the driving shaft 332 to provide power that operates the driving shaft 332 and the wiper 331. The driving motor 333 may comprise a general motor.

The ultraviolet intensity meter 34 functions to measure the intensity of the ultraviolet rays emitted from the ultraviolet lamp 32, and may be provided on the outer circumference of the body 31 in such a way as to pass through the body 31. Since the ultraviolet intensity meter 34 is connected to the control unit 4, the control unit 4 operates the sleeve washing unit 33 when the intensity of the measured ultraviolet rays is less than a predetermined range. The operating principle will be described below in detail.

The temperature sensor 35 functions to measure the internal temperature of the body 31 of the ultraviolet treatment unit 3, and may be provided on the outer circumference of the body 31 or provided in the body 31. Since the temperature sensor 46 is connected to the control unit 4, the control unit 4 stops operating the ultraviolet treatment unit 3 if the internal temperature of the body 31 exceeds a predetermined range.

The operating principle of the ultraviolet treatment unit 3 including the above components will be described below. First, ballast water which flows through the inlet 311 into the body 31 is sterilized by the ultraviolet rays which are radiated from the ultraviolet lamp 32, prior to being discharged through the outlet 312. At this time, if foreign substances adhere to the surface of the sleeve 321 surrounding the ultraviolet lamp 32, the intensity of the ultraviolet rays emitted from the ultraviolet lamp 32 is reduced. When the intensity of the ultraviolet rays measured by the ultraviolet intensity meter 34 is reduced under a predetermined range, the sleeve washing unit 33 is operated under the control of the control unit 4. While the wiper 331 is moved along the driving shaft 332 by the operation of the driving motor 333, foreign substances are removed from the surface of the sleeve 321. Further, when the internal temperature of the body 31 measured by the temperature sensor 35 exceeds a predetermined range, the control unit 4 stops the operation of the ultraviolet treatment unit 3. As such, the present invention uses both a method of physically filtering ballast water using the filter and a method of sterilizing ballast water using the ultraviolet rays so as to treat the ballast water, thus preventing secondary contamination due to byproducts, preventing the contamination of the ballast tank, and allowing the ultraviolet treatment unit to be automatically washed, therefore always keeping performance uniform and enabling efficient maintenance. Further, the present invention allows the ultraviolet treatment unit to be automatically washed without the necessity of stopping a ballast water treating operation, thus enhancing treatment efficiency, therefore being efficient in terms of treatment time or cost.

The control unit 4 functions to control the overall operation of the filtering unit 1, the back-pressure formation unit 2, and the ultraviolet treatment unit 3. As described above, the control unit 4 is connected to the automatic washing unit 13, the pressure sensor 21, the first control valve 22, the sleeve washing unit 33, the ultraviolet intensity meter 34, and the temperature sensor 35, and transceives signals from and to the above components, thus controlling the overall operation. The control unit 4 may further function to store data and transmit a warning message.

As shown in FIG. 3, the ballast water treatment device according to another embodiment of the present invention may further include a bypass duct 6 between the filtering unit 1 and the ultraviolet treatment unit 3 so that the ballast water passes through only either the filtering unit 1 or the ultraviolet treatment unit 3 to be treated, as necessary. That is, the bypass duct 6 allows ballast water to flow between the filtering unit 1 and the ultraviolet treatment unit 3. Generally, ballast water is treated while passing sequentially through the filtering unit 1 and the ultraviolet treatment unit 3. However, if the bypass duct 6 is installed, the ballast water may pass through only either the filtering unit 1 or the ultraviolet treatment unit 3 to be treated. Particularly in the case of discharging the ballast water stored in the ballast tank 5 to the sea, the ballast water may be discharged without passing through the filtering unit 1 or the ultraviolet treatment unit 3. Thus, it is effective in terms of treatment time and cost.

Figure 7:
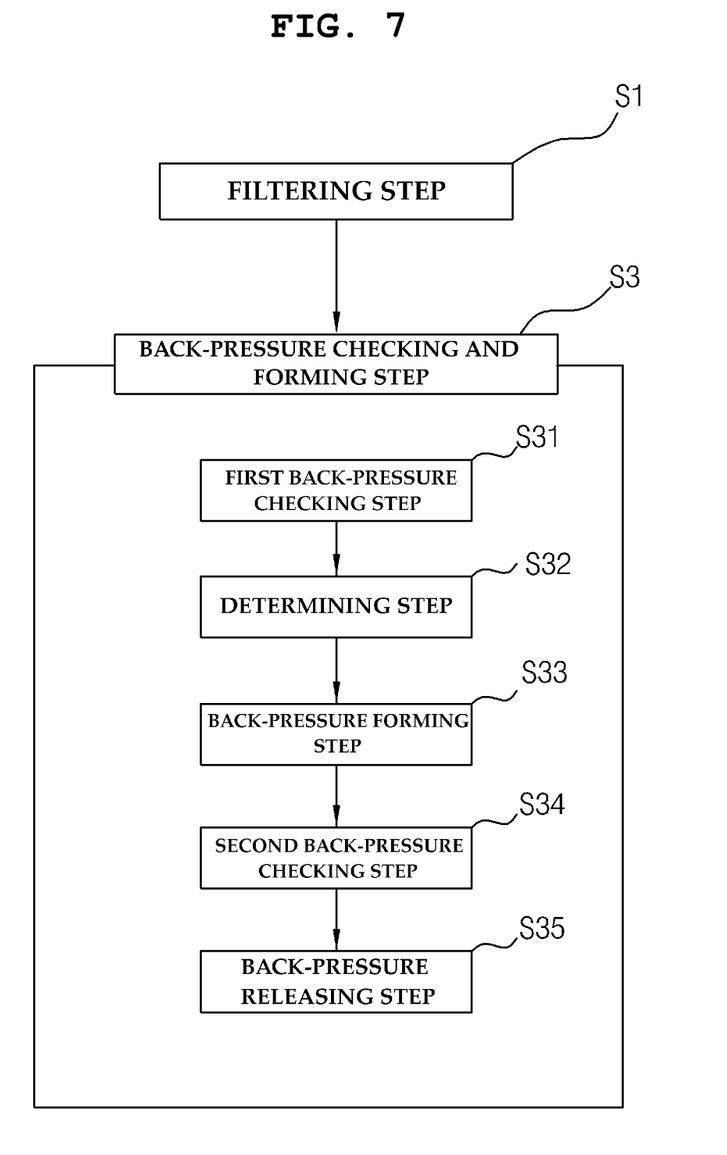
FIG. 7 is a flowchart showing a method of controlling the ballast water treatment system having the back-pressure formation unit, according to an embodiment of the present invention.
Figure 8:
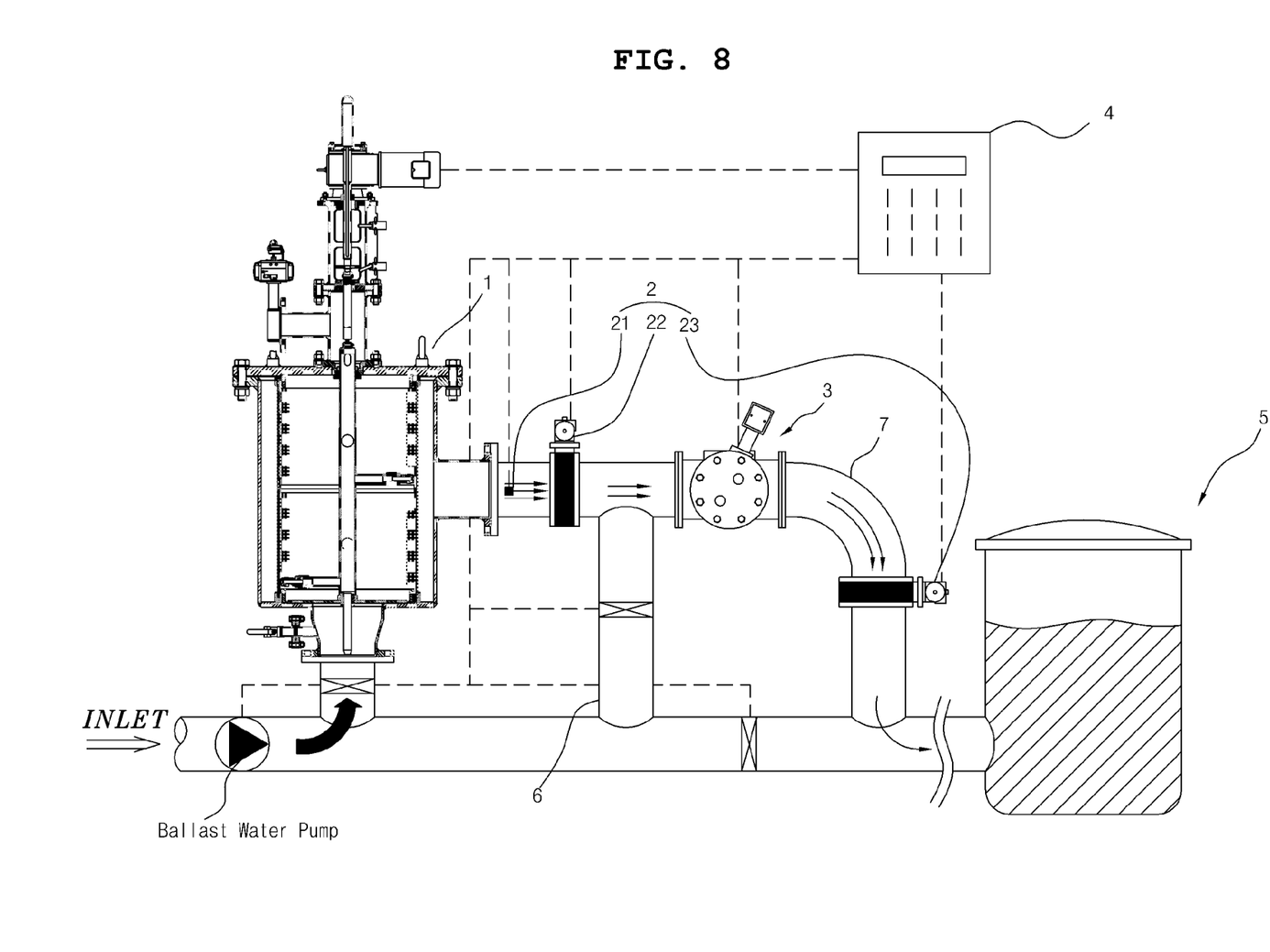
FIG. 8 is a view showing a process of controlling a flow rate of ballast water by the control method of FIG. 7.

FIG. 7 is a flowchart showing a method of controlling the ballast water treatment system having the back-pressure formation unit, according to an embodiment of the present invention, and FIG. 8 is a view showing a process of controlling a flow rate of ballast water by the control method of FIG. 7.

Hereinafter, the method of controlling the ballast water treatment system having the back-pressure formation unit according to the present invention will be described with reference to FIGS. 3 to 8.

The method of controlling the ballast water treatment system having the back-pressure formation unit according to an embodiment of the present invention includes a filtering step S1 of filtering ballast water using the filtering unit 1, and a back-pressure checking and forming step S3 of checking and forming back-pressure in the filtering unit 1 through the back-pressure formation unit 2 when foreign substances adhering to the filter 12 of the filtering unit 1 are back washed by the automatic washing unit 13, thus allowing a back washing operation to be smoothly performed. The back-pressure checking and forming step S3 includes a first back-pressure checking step S31 of checking back-pressure in the filtering unit 1 via the pressure sensor 21, a determining step S32 of determining whether back-pressure measured at the back-pressure checking step S31 meets a reference value which is required for back washing, via the control unit 4, a back-pressure forming step S33 of forming back-pressure in the filtering unit 1 by controlling the first control valve 22, which is provided on the duct 7 in which ballast water filtered by the filtering unit 1 flows so as to control the flow rate of the ballast water flowing in the duct 7, via the control unit 4, a second back-pressure checking step S34 of checking the formation of final back-pressure, and a back-pressure releasing step S35 of releasing back-pressure that is artificially formed by controlling the first control valve 22 and/or the second control valve 23 via the control unit 4 when a foreign-substance back washing operation for the filter 12 of the filtering unit 1 has been completed by the automatic washing unit 13.

At the filtering step S1, ballast water is filtered via the filtering unit 1. At this step, ballast water in the ship is introduced through the inlet 111 into the body 11 of the filtering unit 1 including the filter 12, and thereafter the ballast water is filtered via the filter 12, prior to discharging the filtered ballast water through the outlet 112.

At the back-pressure checking and forming step S3, back-pressure in the filtering unit 1, namely, the body 11 is checked and back-pressure is formed as necessary, via the back-pressure formation unit 2, so as to perform a smooth back washing operation, when the operation of back washing foreign substances off from the filter 12 of the filtering unit 1 is conducted by the automatic washing unit 13. This step will be described below in detail.

First, at the first back-pressure checking step S31, back-pressure in the filtering unit 1, namely, the body 11 is checked by the pressure sensor 21. When the operation of back washing foreign substances off from the filter 12 of the filtering unit 1 is conducted by the automatic washing unit 13, back-pressure is measured by the pressure sensor 21 and then the measured back-pressure is transmitted to the control unit 4 so as to determine a time when the back washing operation is required or determine whether back-pressure required for the back washing operation is formed or not.

Next, at the determining step S32, it is determined whether back-pressure measured via the control unit 4 at the back-pressure checking step S31 meets a reference value required for the back washing operation. If the back washing operation is required, the control unit 4 determines whether back-pressure in the filtering unit 1, namely, the body 11 measured via the pressure sensor 21 at the back-pressure checking step S31 meets a reference value required for the back washing operation. If the measured back-pressure meets the reference value, the back washing operation is immediately conducted by the automatic washing unit 13. Meanwhile, if the measured back-pressure does not meet the reference value, the back-pressure forming step S33 that will be described below is conducted.

At the back-pressure forming step S33, the first control valve 22 that is provided on the duct 7 in which ballast water filtered by the filtering unit 1 flows so as to control the flow rate of the ballast water flowing in the duct 7 is controlled by the control unit 4, thus forming back-pressure in the filtering unit 1. As described above, if it is determined at the determining step S32 that the measured back-pressure does not meet a reference value required for the back washing operation, the control unit 4 transmits a control signal to the first control valve 22 to close the first control valve 22, thus reducing or blocking the flow of the ballast water through the first control valve 22, therefore forming back-pressure in the filtering unit 1, namely, the body 11 such that the back-pressure meets the reference value required for the back washing operation. At this time, at the back-pressure forming step S33, the second control valve 23, provided on the duct 7 in which ballast water treated by the ultraviolet treatment unit 3 flows so as to control the flow rate of the ballast water flowing in the duct 7, is controlled together with the first control valve 22 via the control unit 4, thus forming back-pressure in the body 11. The second control valve 23 is operated together with the first control valve 22 and is located behind the ultraviolet treatment unit 3. Thus, in comparison with the case wherein only the first control valve 22 is operated, the flow rate of the ballast water flowing through the duct 7 and introduced into the ultraviolet treatment unit 3 may also be controlled as necessary, thus increasing the efficiency of treating the ballast water, and enabling a flow rate controlling operation and a back-pressure controlling operation of the control unit 4 to be more precisely performed. That is, as shown in FIG. 8, the back-pressure is formed by simultaneously controlling the first control valve 22 and the second control valve 23 (i.e., by controlling the flow rate in stages according to a section from the filtering unit to the first control valve, a section from the first control valve to the second control valve, and a section behind the second control valve). Thereby, the back-pressure in the body 11 may be controlled to meet a reference value, and simultaneously the flow rate of the ballast water introduced into the ultraviolet treatment unit 3 may be controlled such that the efficiency of the ultraviolet treatment unit 3 is not lowered. As a result, the overall treatment efficiency of the ballast water treatment system may be increased.

At the second back-pressure checking step S34, it is finally checked whether back-pressure formed in the body 11 at the back-pressure forming step S33 meets a reference value required for the back washing operation. If the back-pressure meets the reference value, the control unit 4 performs a control such that the automatic washing unit 13 conducts the back washing operation.

Finally, at the back-pressure releasing step S35, when foreign substances have been back washed off from the filter 12 of the filtering unit 1 by the automatic washing unit 13, the first control valve 22 and/or the second control valve 23 are controlled by the control unit 4, thus releasing back-pressure that is artificially formed. After the back washing operation has been completed by the automatic washing unit 13, the control unit 4 opens the first control valve 22 and/or the second control valve 23, thus allowing ballast water to be smoothly treated by the filtering unit 1 and/or the ultraviolet treatment unit 3.

The construction, assembly, and use of the present invention can achieve the following effects.

The present invention is advantageous in that back-pressure in a filtering unit is checked and formed during a back washing operation for a filter of a filtering unit, thus enabling the back washing operation to be efficiently performed.

The present invention is advantageous in that it uses both a method of physically filtering ballast water using a filter and a method of sterilizing ballast water using ultraviolet rays so as to treat ballast water, thus preventing secondary contamination due to byproducts, preventing the contamination of a ballast tank, enabling efficient maintenance, and making it easy to control.

The present invention is advantageous in that a flow rate of ballast water introduced into an ultraviolet treatment unit is controlled such that the efficiency of the ultraviolet treatment unit is not reduced, while back-pressure is formed in a filtering unit, thus increasing the overall treatment efficiency of a ballast water treatment system.

The present invention is advantageous in that it allows a filtering unit or an ultraviolet treatment unit to be automatically washed, thus always maintaining uniform performance, and enabling efficient maintenance.

The present invention is advantageous in that a bypass duct is further provided between a filtering unit and an ultraviolet treatment unit, thus allowing ballast water to be treated while passing through only either the filtering unit or the ultraviolet treatment unit, as necessary.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a ballast water treatment system having a back-pressure formation unit, the method comprising the steps of:
   (A) filtering ballast water using a filtering unit, comprised of:
      (1) a body through which ballast water flows that has an inlet and an outlet that respectively permit inflow and outflow of the ballast water;
      (2) a filter located in the body to filter the ballast water introduced via the inlet and provide a flow of filtered ballast water; and
      (3) an automatic washing unit for removing foreign substances from the filter during a back washing operation when needed using a difference between pressure inside the body and pressure outside the body, the automatic washing unit comprising a suction unit for sucking off the foreign substances adhering to the filter; and an exhaust unit in communication with the suction unit for discharging the foreign substances outside of the body;
   (B) sterilizing the filtered ballast water using an ultraviolet treatment unit that receives the flow of filtered ballast water from the filtering unit and that includes a temperature sensor and an ultraviolet lamp for sterilizing the filtered ballast water using ultraviolet rays to provide a flow of sterilized ballast water;
   (C) checking and forming an amount of back-pressure in the filtering unit meeting a reference value to enable a back washing operation to be smoothly performed while maintaining the efficiency of the ultraviolet treatment unit by maintaining the flow of filtered ballast water to the ultraviolet treatment unit, using a back-pressure formation unit comprised of:
      (1) a pressure sensor for checking back-pressure in the body;
      (2) a first control valve provided in a duct through which the filtered ballast water flows between the outlet of the body and the ultraviolet treatment unit;
      (3) a second control valve provided in a duct in which the sterilized ballast water flows from the ultraviolet treatment unit to a ballast tank; and
      (4) a control unit that is connected to components including the automatic washing unit, the pressure sensor, the first control valve, the second control valve, and the temperature sensor, that transceives signals from and to the components to control operations of the ballast water treatment system, that checks the back pressure measured by the pressure sensor and if not meeting a reference value
         (a) forms back pressure by simultaneously controlling the first control valve and the second control valve to vary flow rate from the body to the ultraviolet treatment unit effective to maintain efficiency of the ultraviolet treatment unit,
      or if the amount of formed back-pressure meets the reference value,
         (b) signals the automatic washing unit to conduct the back washing operation.

2. The method as set forth in claim 1, wherein checking and forming the back-pressure further comprises releasing artificially formed back-pressure by controlling the first control valve and the second control valve via the control unit, when a back washing operation of removing foreign substances from the filter of the filtering unit has been completed by the automatic washing unit.

* * * * *